United States Patent [19]
Joo

[11] Patent Number: 4,504,350
[45] Date of Patent: Mar. 12, 1985

[54] CAP HEAT-SEALING APPARATUS FOR PAPER CONTAINERS

[75] Inventor: Katsuhiro Joo, Tokushima, Japan

[73] Assignee: Shikoku Kakooki Co., Ltd., Tokushima, Japan

[21] Appl. No.: 514,235

[22] Filed: Jul. 15, 1983

[30] Foreign Application Priority Data

Jul. 15, 1982 [JP] Japan .................. 57-123941

[51] Int. Cl.³ ........................... B32B 31/20
[52] U.S. Cl. ..................... 156/380.8; 53/478; 53/DIG. 2; 156/69; 156/379.7; 156/583.3; 493/103; 493/133
[58] Field of Search ............ 156/69, 272.2, 272.4, 156/273.9, 274.2, 309.6, 379.6, 379.7, 380.6, 583.1, 583.91, 583.3; 53/DIG. 2, 478, 488, 329, 489, 348, 350, 330, 365, 374, 375; 493/102, 103, 133, 153, 156, 174

[56] References Cited

U.S. PATENT DOCUMENTS

| 2,579,775 | 12/1951 | Allen et al. | 53/350 |
| 2,704,179 | 3/1955 | Wilcox | 493/102 X |
| 3,379,595 | 4/1968 | Bracey, Jr. | 156/306 |
| 3,549,440 | 12/1970 | Adcock et al. | 156/69 |
| 4,237,360 | 12/1980 | Pohlent | 219/10.41 |
| 4,246,461 | 1/1981 | Jeppson | 219/10.53 |
| 4,301,640 | 11/1981 | Haas | 53/478 |
| 4,305,771 | 12/1981 | McLaren | 156/69 X |
| 4,344,814 | 8/1982 | McLaren | 156/581 |

Primary Examiner—Robert Dawson
Attorney, Agent, or Firm—Armstrong, Nikaido, Marmelstein & Kubovcik

[57] ABSTRACT

A cap heat-sealing apparatus for paper containers comprises a vertically movable head, a fixed pressing member provided on the bottom surface of the head, a pair of divided movable pressing members arranged around the fixed pressing member and connected to the head so as to be horizontally movable toward or away from the fixed pressing member, and a heating high-frequency coil attached to the head and surrounding the fixed pressing member. The fixed pressing member has an outer periphery shaped to position along the inner surfaces of heat-sealing container opening edge fitting portions of inverted V-shaped cross section formed at the outer periphery of a square paper cap, which has an aluminum foil layer. The movable pressing members have an inner periphery shaped to position along the outer surfaces of the fitting portions. The high-frequency coil is spaced apart from the fixed pressing member by a clearance for the fitting portions to enter.

2 Claims, 7 Drawing Figures

CAP HEAT-SEALING APPARATUS FOR PAPER CONTAINERS

The present invention relates to a cap heat-sealing apparatus for paper containers, and more particularly to a heat-sealing apparatus for paper containers comprising a container main body and a cap at least one of which has a heat-sealing thermoplastic synthetic resin layer for attaching the cap to the opening edge portion of the main body by heat sealing.

Paper containers filled with fluid food are usually prepared from a square tube of paper having a thermoplastic synthetic resin layer on each of its inner and outer surfaces and horizontally bent at its lower end to form a bottom wall. The upper end of the tube is bent to an inverted V shape to close the opening and heat-sealed. Containers of such a shape are inconvenient to transport and store because they are not flat at the top and are not adapted for stacking. Accordingly it appears useful to prepare a container with an opening of rectangular to square horizontal section and close the opening with a cap having a shallow inverted U-shaped vertical section. However, rectangular or square caps, unlike circular ones, are generally thought undesirable for containers of the type described, since the contents are liable to leak from the corner portions of the cap.

An object of the present invention is to provide an apparatus for heat-sealing rectangular to square caps of paper containers without entailing the problem of leakage of the contents.

The present invention provides a cap heat-sealing apparatus for paper containers comprising a vertically movable head, a fixed pressing member provided on the bottom side of the head, divided movable pressing members arranged around the fixed pressing member and connected to the head so as to be horizontally movable toward or away from the fixed pressing member, and a heating high-frequency coil attached to the head and surrounding the fixed pressing member, the fixed pressing member having an outer periphery shaped to position along the inner surface of a heat-sealing container opening edge fitting portion of inverted V-shaped cross section formed at the outer periphery of a paper cap, the paper cap having an aluminum foil layer, the movable pressing members having an inner periphery shaped to position along the outer surface of the fitting portion, the high-frequency coil being spaced apart from the fixed pressing member by a clearance for the fitting portion to enter, whereby the cap, even if rectangular or square, can be sealed without any likelihood of leakage of the contents. The paper container thus closed with the cap is more convenient to transport or store than the conventional paper containers having an upper end of inverted V-shaped section.

With reference to the drawings, an embodiment of the invention will be described below for illustrative purposes only.

Figure 1:
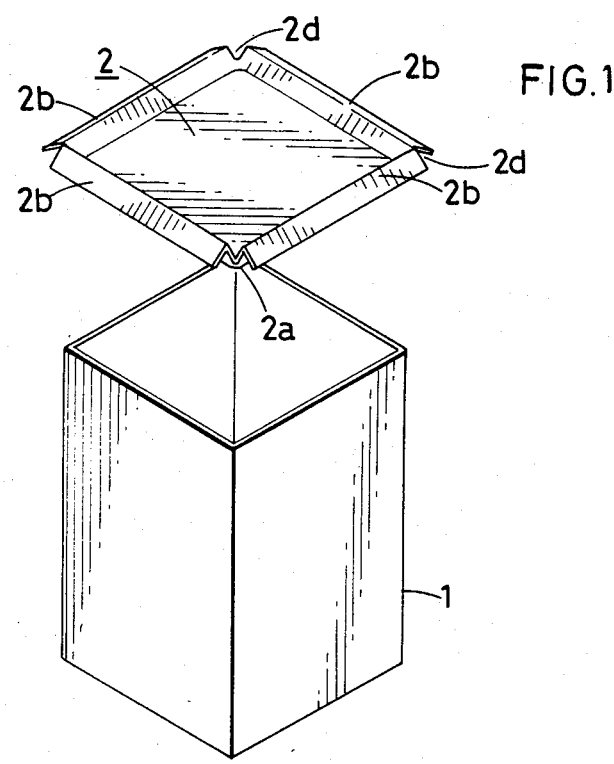
FIG. 1 is a perspective view showing the main body of a paper container and a cap before it is attached to the main body.
Figure 2:
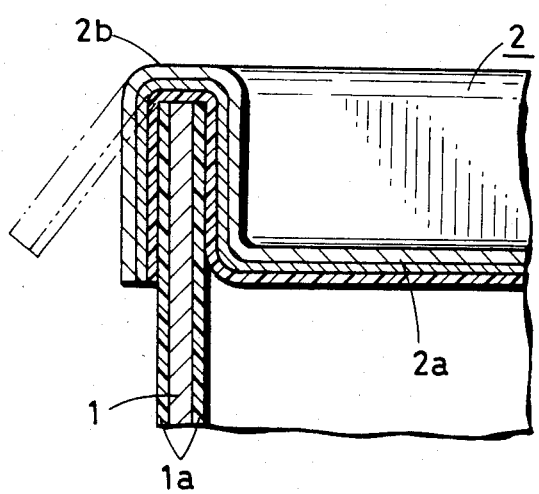
FIG. 2 is an enlarged fragmentary view in vertical section showing the cap as adhered to the container main body by heat sealing.
Figure 3:
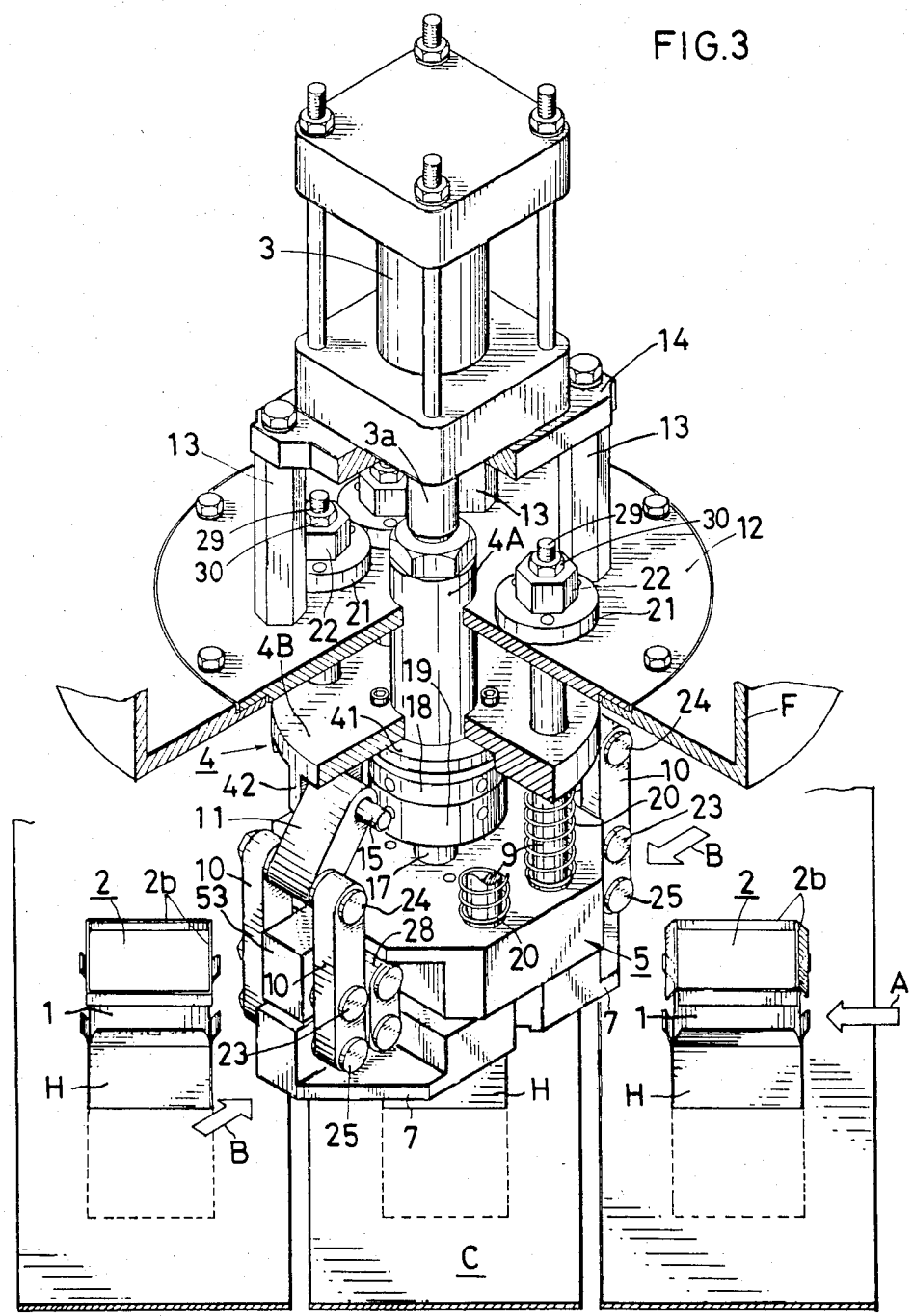
FIG. 3 is a perspective view partly broken away and showing a heat-sealing apparatus.
Figure 4:
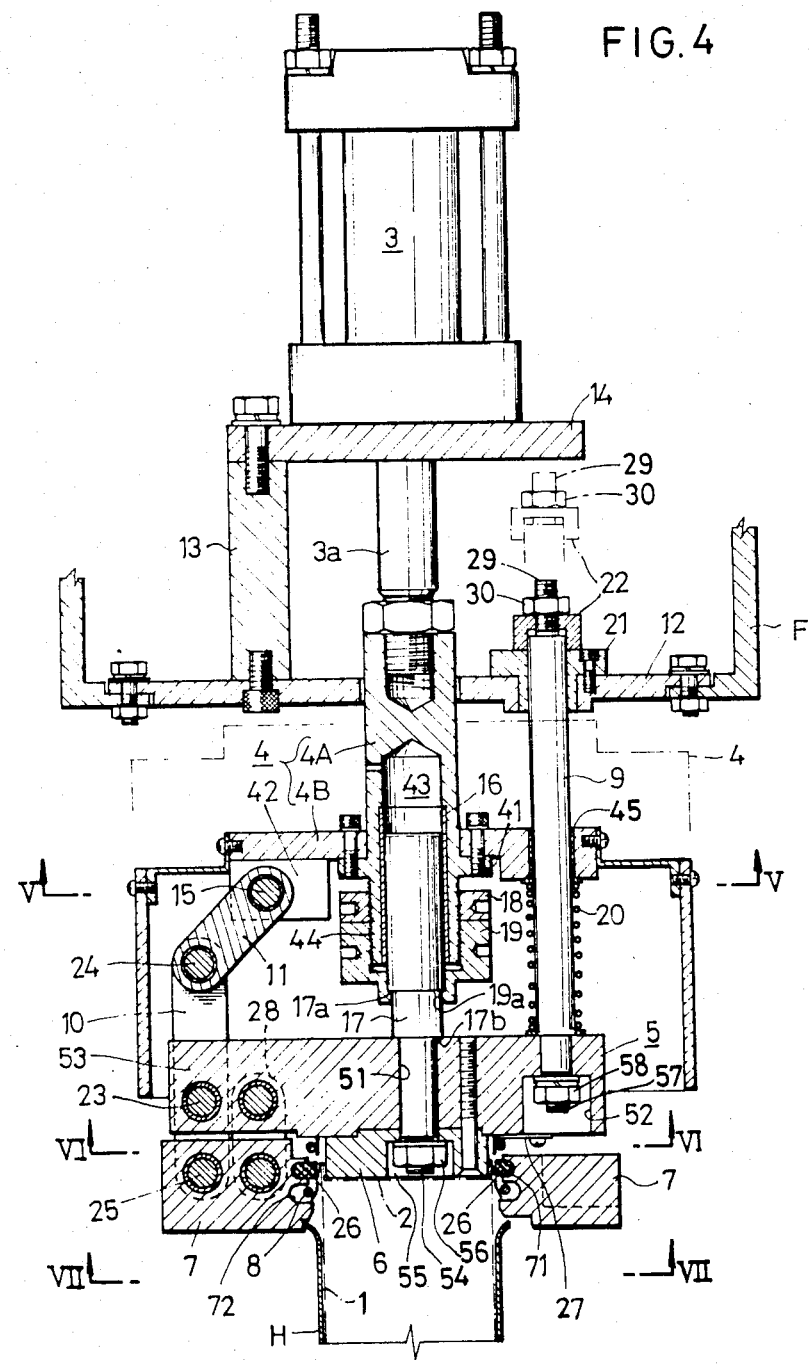
FIG. 4 is a view in vertical section showing the heat-sealing apparatus of FIG. 3.
Figure 5:
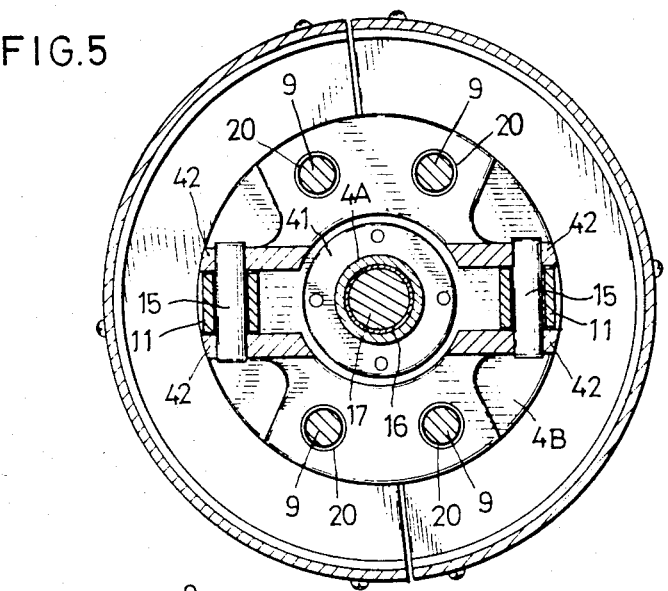
FIG. 5 to FIG. 7 are views in section taken along the line V—V, line VI—VI and line VII—VII, respectively, in FIG. 4.
Figure 6:
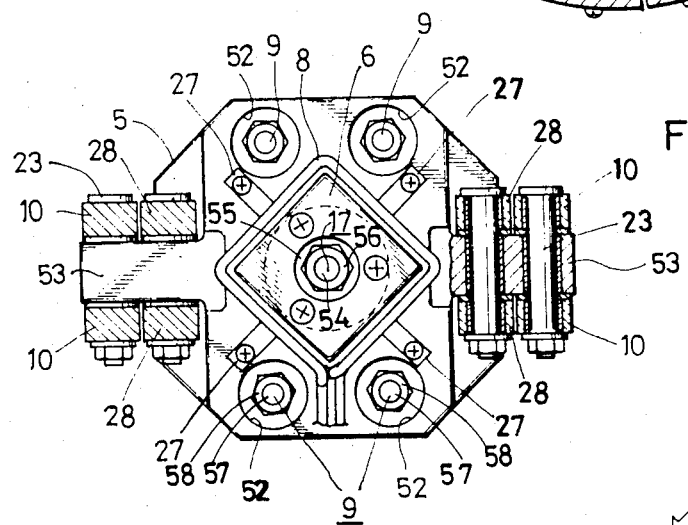

FIG. 1 shows a container main body 1 in the form of a tube of square cross section, and a square cap 2 before the cap is attached to the main body 1. In FIG. 2, the cap 2 fitted to the main body 1 before heat sealing is shown in broken lines, and the same as heat-sealed in solid lines. The main body 1, which is made of paper, is formed with a thermoplastic synthetic resin layer 1a on each of its inner and outer surfaces and has an opening at its upper end. The cap 2, which is similarly made of paper, has an aluminum foil layer 2a adhered to its rear surface. A thermoplastic synthetic resin layer 2c is further formed over the lower surface of the aluminum foil layer 2a. The cap 2 is prepared from a square sheet of paper having the aluminum foil layer 2a and the thermoplastic synthetic resin layer 2c and formed with cutouts 2d at the four corners, by folding each side portion of the sheet in two with the front surface out to form a heat-sealing container opening edge fitting portion 2b of upwardly projecting, inserted V-shaped cross section at each side portion of the cap. By an apparatus separate from the present apparatus, the cap 2 is placed over the opening of the main body 1, with the fitting portions 2b loosely fitted over the opening periphery of the main body 1 from above.

FIGS. 3 to 7 show a heat-sealing apparatus embodying the present invention, which is disposed above a container transport conveyor C. By means of a holder H on the conveyor C, the main body 1 having the cap 2 fitted thereto as above before heat sealing is carried in the direction of arrow A shown to a specified position immediately below the apparatus.

The heat-sealing apparatus chiefly comprises a slide lifting hydraulic cylinder 3, a slide 4 disposed under the piston rod 3a of the cylinder, a vertically movable head 5 suspended from the slide 4, a fixed pressing member 6 which is square when seen from above and provided on the bottom side of the head 5, a pair of divided movable pressing members 7 arranged around the fixed pressing member 6 and connected to the head 5 so as to be horizontally movable toward or away from the fixed pressing member 6, and a heating high-frequency coil 8 attached to the head 5 and surrounding the fixed pressing member 6. The fixed pressing member 6 has an outer periphery shaped to position along the inner surfaces of the fitting portions 2b of the cap 2. The movable pressing members 7 have an inner periphery shaped to position along the outer surfaces of the fitting portions 2b. A clearance for the fitting portions 2b to enter is formed between the fixed pressing member 6 and the high-frequency coil 8.

The hydraulic cylinder 3 is oriented vertically downward and supported by support members 13, 14 on a circular mount plate 12 fixed to a frame F and closing an aperture formed in the frame. The slide 4 comprises a vertically movable rod 4A extending through the mount plate 12 and fixed to the lower end of the piston rod 3a of the cylinder 3, and a vertically movable plate 4B bolted to a flange 41 on the movable rod 4A. A pair of opposed walls 42 positioned on each of opposite sides of the rod 4A extends downward from the lower surface of the movable plate 4B. A link 11 extending obliquely downward has an upper end positioned between the opposed walls 42 and pivoted to the walls 42 by a horizontal pin 15 (see FIG. 5). The vertically movable rod 4A has a guide bore 43 extending upward from its lower end and having a bush 16 intimately fitted therein. A slide rod 17 extending upright from the head 5 is inserted into the bush from below. The slide rod 17 has upper and lower two stepped portions 17a and 17b and is thereby divided into three, i.e., a large-diameter portion, a medium-diameter portion and a small-dimeter portion which are so arranged downward. The large-diameter portion is fitted in the guide bore 43. Under the flange 41, the vertically movable rod 4A has an externally threaded portion 44 having screwed thereon a lock nut 18 and an adjusting nut 19 serving also to hold the slide rod. The medium-diameter portion of the slide rod 17 is inserted through the lower end of the adjusting nut 19 which end is formed with an inward projecting 19a engaging the upper stepped portion 17a from below, whereby the slide rod 17 is prevented from slipping off from the guide bore 43.

The vertically movable head 5 is formed with a hole 51 extending therethrough. The small-diameter portion of the slide rod 17 is inserted through the hole 51, and the upper edge defining the hole 51 engages the lower stepped portion 17b of the rod 17 from below. The slide rod 17 has a lower end projecting downward beyond the head 5 and externally threaded as at 54. The fixed pressing member 6 has a cavity 55 in its bottom side and a bore communicating with the cavity and extending through the member 6. The small-diameter portion of the slide rod 17 is inserted through the bore, and a nut 56 is screwed on the threaded portion 54 within the cavity 55, whereby the head 5 and the fixed pressing member 6 are fastened together between the lower stepped portion 17b and the nut 56. Around the hole 51, the head 5 has a plurality of cavities 52 formed in its lower side and bores extending therethrough and communicating with the cavities. Each of guide rods 9 has at its lower end a small-diameter portion extending through the bore and an externally threaded portion 57 positioned within the cavity 52 and projecting from the bored portion. With nuts 58 tightened up on the threaded portions 57 of the guide rods 9, the plurality of guide rods 9 around the slide rod 17 are made to extend upright from the head 5. Flanged short tubular guide members 21 having the upper ends of the guide rods 9 slidably inserted therethrough individually are mounted on and extend through the mount plate 12. The vertically movable plate 4B is formed with bores having intermediate portions of the guide rods 9 extending therethrough and each having a bush 45 intimately fitted therein. Compression springs 20 fitting around the guide rods 9 are interposed between the movable plate 4B and the head 5. The portion of each guide rod 9 projecting upward beyond the guide member 21 is externally threaded as at 29. An adjusting nut 22 serving also to prevent the guide rod 9 from falling off the mount plate 12 by bearing on the top of the guide member 21 and a lock nut 30 on the nut 22 are screwed on the threaded portion 29.

The vertically movable head 5 is provided at each of its opposite sides with an outward projection 53 (see FIG. 6), to which intermediate portions of a pair of levers 10 for operating the movable pressing member are pivoted by horizontal pins 23. Opposite ends of the lever 10 are pivoted to the lower end of the link 11 and the movable pressing member 7 by horizontal pins 24 and 25 respectively. In addition to the levers 10, support links 28 parallel therewith connect the movable pressing member 7 to the head 5, whereby the movable pressing member 7 is held in a horizontal position at all times.

Figure 7:
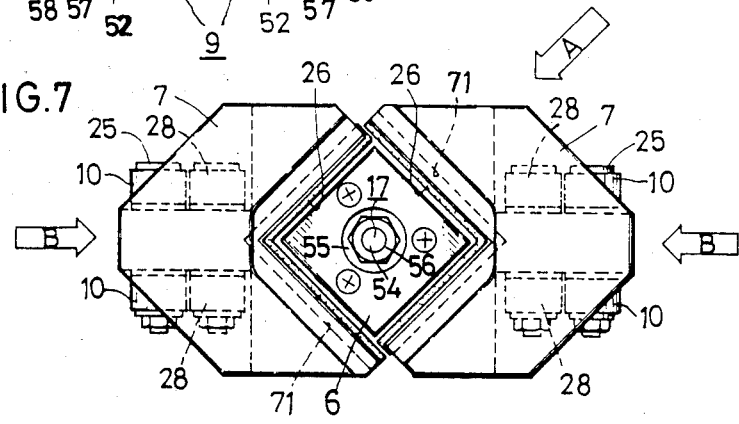

As shown in FIG. 7, the movable pressing members 7 are opposed to each other with the fixed pressing member 6 positioned therebeween. The opposed faces of the members 7 are V-shaped when seen from above and define a square when brought toward each other. They are movable toward and away from each other in the direction of a diagonal of the square (indicated by arrow B as illustrated). This direction is at an angle of 45 degrees with the above-mentioned direction of transport of containers (arrow A). Each of the opposed inner surfaces of the movable pressing members 7 is formed at the midportion of their height with a groove 71 of U-shaped cross section. An elastic member 26 of heat-resistant rubber or the like is fixedly fitted in the groove 71. When the pair of pressing members 7 are moved toward each other, the outer periphery of the fixed pressing member 6 is pressed on by the elastic members 26, with the fitting portions 2b of the cap 2 interposed therebetween. The heating high-frequency coil 8 is in the form of a square ring when seen from above and comprises upper and lower segments in two stages (see FIG. 6). The high-frequency coil 8 is fixed to the lower surface of the head 5 by a bracket 27 and is positioned above and below the elastic members 26 on the pair of movable pressing members 7 when these members 7 are brought toward each other. A groove 72 for positioning the coil free of interference is formed in the inner surface of each movable pressing member 7 below the groove 71 for the elastic member.

When the container main body 1 is sent forward to the aforesaid specified position with the fitting portions 2b of the cap 2 fitted to the opening edge of the container, the hydraulic cylinder 3 operates to project its piston rod 3a, causing the head 5 to descend with the slide 4 to a lower limit position, whereby the head 5 is halted by the nuts 22 on the guide rods 9 which nuts serve as stoppers. In this state, the fixed pressing member 6 is in pressing contact with the inner surfaces 2b of the cap 2 (see FIG. 4).

When the rod 3a further projects in this state, the slide 4 further descends and approaches the head 5 while compressing the springs 20 and permitting the slide rod 17 to retract into the guide bore 43. With this movement, the links 11 connected to the slide 4 push the upper ends of the levers 10 outward, thereby turning the levers 10 on the horizontal pins 23 to move the lever lower ends inward, with the result that the pair of movable pressing members 7 are moved horizontally toward each other. By this movement, the elastic members 26 on the members 7 are pressed against the outer surfaces of the fitting portions 2b of the cap 2 in which the fixed pressing member 6 is fitted in contact with the inner surfaces of the fitting portions 2b. As a result, the fitting portions 2b are pressed against the opening edge of the container from inside and outside. With the fitting portions 2b thus pressed on, the high-frequency coil 8 is energized for a required period of time to subject the aluminum foil to induction heating, whereby the thermoplastic synthetic resin layer 2c of the fitting portions 2b is fused to the thermoplastic synthetic resin layers 1a of the container main body 1 to heat-seal the container opening edge over its opposite sides.

Usually polyethylene is used for the thermoplastic resin layers 1a. A composition consisting essentially of ethylene-vinyl acetate copolymer and a wax is suited for forming the thermoplastic resin layer 2c beneath the aluminum foil layer 2a. The thermoplastic resin layer may be present on the surface to be heat-sealed of one of the container opening edge and the cap. The container main body need not always be in the form of a square tube but can be circular or polygonal other than square, in cross section. The number of the divided fitting portions of the cap as well as that of the divided movable pressing members is determined in accordance with the shape of the container main body.

I claim:

1. A cap heat-sealing apparatus for paper containers comprising a vertically movable head, a fixed pressing member provided on the bottom side of the head and divided movable pressing members arranged around the fixed pressing member and connected to the head so as to be horizontally movable toward or away from the fixed pressing member, the fixed pressing member having an outer periphery shaped in the form of a square, to position along the inner surface of a heat-sealing container opening edge fitting portion of inverted V-shaped cross section formed at the outer periphery of a square paper cap, the paper cap having an aluminum foil layer, the movable pressing members being opposed to each other in a pair with the fixed pressing member positioned therebetween and movable toward and away from each other in a diagonal direction, the opposed surfaces of the movable pressing members being V-shaped when seen from above and defining a square to position along the outer periphery of said fitting portion when brought toward each other, an elastic member being provided on the inner peripheral surface of each of the movable pressing members, a high frequency coil being attached to the vertically movable head at two different levels and surrounding the fixed pressing member so that it positions above and below the elastic member when the pressing members are moved toward each other, the high frequency coil comprising two segments and being shaped in the form of a square ring and further spaced apart from the fixed pressing member by a clearance for the fitting portion to enter.

2. An apparatus claimed in claim 1, comprising a vertically movable head disposed below a slide at a predetermined distance therefrom, the slide being movable by a hydraulic cylinder, the hydraulic cylinder being attached as oriented downward to a mount plate, the slide comprising a vertically movable rod extending through the mount plate and fixed to the lower end of the piston rod of the hydraulic cylinder and a vertically movable plate fixed to the vertically movable rod, the head having a slide rod extending upright from its center and a plurality of upright guide rods arranged at a predetermined spacing around the slide rod, the slide rod being inserted in a guide bore formed in the vertically movable rod and extending upward from its lower end, the guide rod extending through the vertically movable plate and the mount plate, projecting upward beyond the mount plate and having a stopper at its projecting end, a compression spring being fitted around each of the guide rods and interposed between the vertically movable plate and the head, operating levers being provided for the movable pressing members in corresponding relation thereto and each pivoted at an intermediate portion thereof to the head, the vertically movable plate having links pivoted thereto and extending obliquely downward, each of the levers having an upper end pivoted to the lower end of the corresponding link and a lower end pivoted to the corresponding movable pressing member, the movable pressing members being horizontally movably connected to the head by support links arranged in parallel with the levers.

* * * * *